(12) United States Patent
Vella et al.

(10) Patent No.: US 7,852,375 B2
(45) Date of Patent: Dec. 14, 2010

(54) METHOD OF STABILIZING AN IMAGE SEQUENCE

(75) Inventors: Filippo Vella, Erice (IT); Massimo Mancuso, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 2010 days.

(21) Appl. No.: 10/461,934

(22) Filed: Jun. 13, 2003

(65) Prior Publication Data

US 2004/0001147 A1 Jan. 1, 2004

(30) Foreign Application Priority Data

Jun. 19, 2002 (EP) .................................. 02425403

(51) Int. Cl.
*H04N 3/16* (2006.01)
*H04N 7/12* (2006.01)
*H04N 11/02* (2006.01)
*H04N 11/04* (2006.01)

(52) U.S. Cl. ........................... 348/208.99; 375/240.12; 375/240.16; 348/208.4; 348/208.13; 348/208.14

(58) Field of Classification Search ........................ 375/240.12–240.16; 348/208.99, 208.4, 208.13, 348/208.14

See application file for complete search history.

(56) References Cited

U.S. PATENT DOCUMENTS 4,864,409 A * 9/1989 Platte et al. ............... 348/208.6
5,012,270 A * 4/1991 Sekine et al. .................. 396/54

(Continued)

FOREIGN PATENT DOCUMENTS

EP 0 762 774 A2 3/1997

(Continued)

OTHER PUBLICATIONS

Engelsberg, A. et al., "A Comparative Review of Digital Image Stabilising Algorithms for Mobile Video Communications," *IEEE Trans. on Consumer Electronics* 45(3):591-597, Aug. 1999.

(Continued)

*Primary Examiner*—Marsha D Banks Harold
*Assistant Examiner*—Chikaodili E Anyikire
(74) *Attorney, Agent, or Firm*—Lisa K. Jorgenson; Robert Iannucci; Seed IP Law Group PLLC

(57) ABSTRACT

A method of stabilizing an image sequence, said method comprising the following phases: estimating a first global motion vector comprising a first motion component in a predetermined direction that has associated with it a first respective amplitude and a first respective direction, said first vector being representative of the motion with respect to a reference image of a first image consisting of a pixel matrix, associating said first component with either a wanted motion or an unwanted motion, compensating said first component when it is associated with an unwanted motion, characterized in that the association phase comprises a phase of comparing the first amplitude of said component with a threshold compensation value $$T^{hor}_{comp}$$

assigned to the predetermined direction, said first component being associated with an unwanted or wanted motion whenever the first amplitude is, respectively, smaller than said threshold value $$T^{hor}_{comp}$$

or greater than/equal to it.

20 Claims, 9 Drawing Sheets

U.S. PATENT DOCUMENTS

| | | | |
|---|---|---|---|
| 5,107,293 A * | 4/1992 | Sekine et al. | 396/55 |
| 5,109,249 A * | 4/1992 | Kitajima | 396/53 |
| 5,267,034 A * | 11/1993 | Miyatake et al. | 348/352 |
| 5,291,300 A * | 3/1994 | Ueda | 386/117 |
| 5,311,305 A | 5/1994 | Mahadevan et al. | |
| 5,682,205 A * | 10/1997 | Sezan et al. | 348/452 |
| 5,909,242 A | 6/1999 | Kobayashi et al. | 348/208 |
| 6,169,574 B1 * | 1/2001 | Noguchi et al. | 348/208.16 |
| 6,628,711 B1 * | 9/2003 | Mathew et al. | 375/240.12 |
| 6,748,158 B1 | 6/2004 | Jasinschi et al. | |
| 6,809,758 B1 * | 10/2004 | Jones | 348/208.99 |
| 2002/0036692 A1 * | 3/2002 | Okada | 348/208 |
| 2002/0039138 A1 * | 4/2002 | Edelson et al. | 348/208 |
| 2003/0072373 A1 | 4/2003 | Sun | 375/240.16 |
| 2005/0243178 A1 | 11/2005 | McConica | |

FOREIGN PATENT DOCUMENTS

| | | |
|---|---|---|
| EP | 1 117 251 A1 | 7/2001 |
| EP | 1 139 669 | 10/2001 |
| WO | WO 99/12355 | 3/1999 |

OTHER PUBLICATIONS

Ko, S. et al., "Digital Image Stabilizing Algorithms Based on Bit-Plane Matching," *IEEE Trans. on Consumer Electronics* 44(3):617-622, Aug. 1998.

Ko, S. et al., "Fast Digital Image Stabilizer Based on Gray-Coded Bit-Plane Matching," *IEEE Trans. on Consumer Electronics* 45(3):598-603, Aug. 1999.

Paik, J. et al., "An Adaptive Motion Decision System for Digital Image Stabilizer Based on Edge Pattern Matching," *IEEE Trans. on Consumer Electronics* 38(3):607-616, Aug. 1992.

Uomori, K. et al., "Automatic Image Stabilizing System by Full-Digital Signal Processing," *IEEE Trans. on Consumer Electronics* 36(3):510-519, Aug. 1990.

F.S. Rovati et al., *IEEE Transactions on Consumer Electronics*, vol. 46, No. 3, Aug. 2000, 9 pages.

* cited by examiner

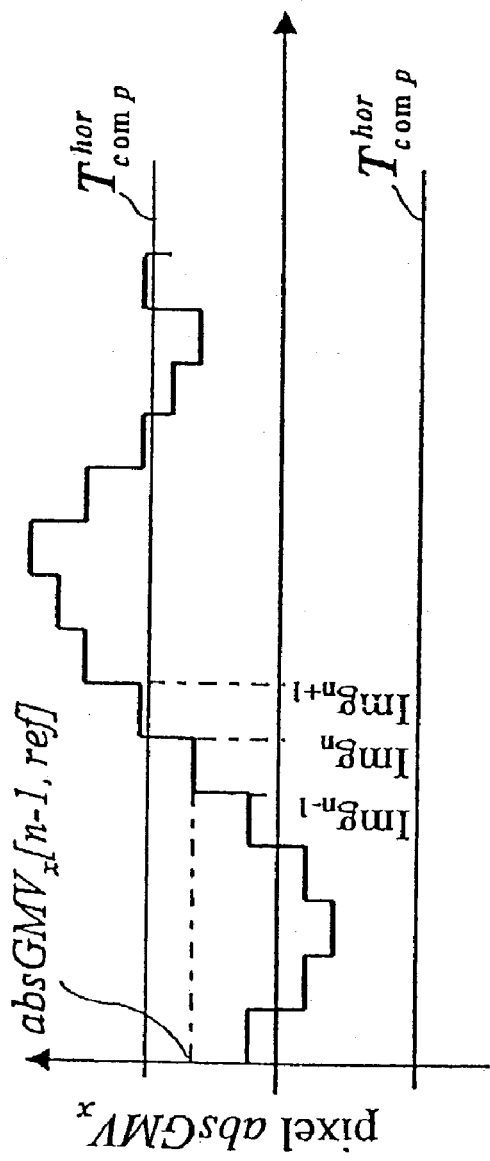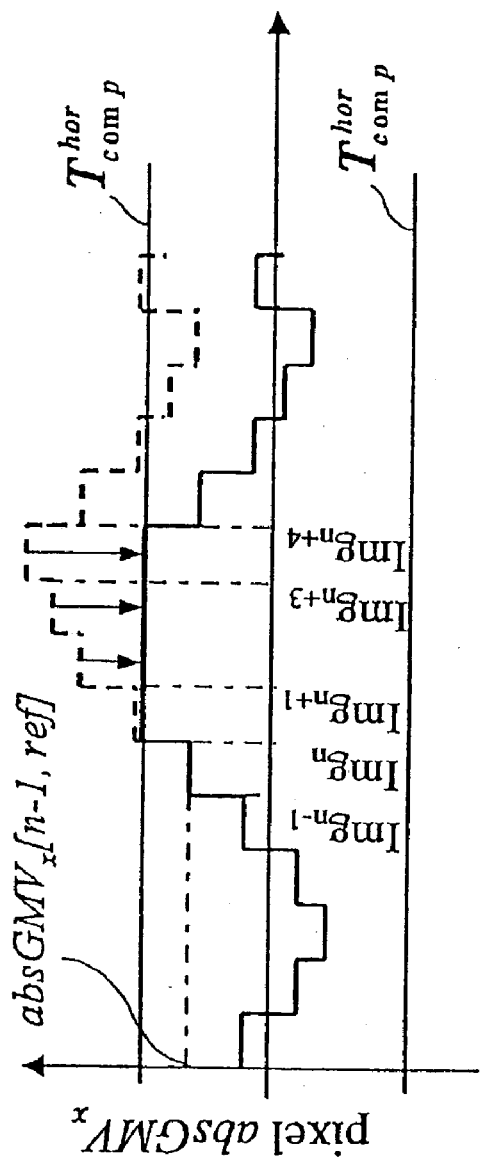
Fig. 6A
Fig. 6B

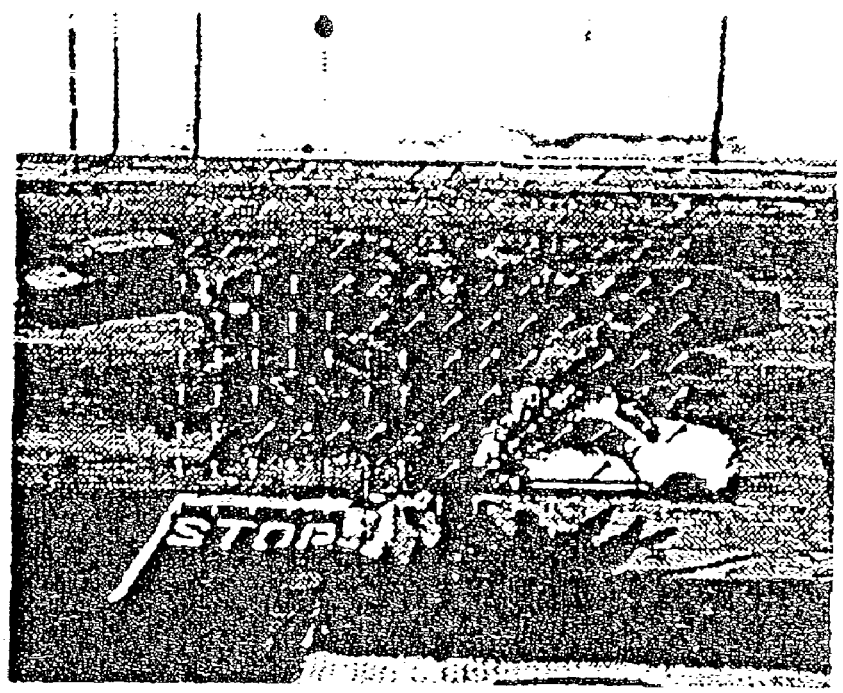
Figure 7A. Input frame with Foreground BMVs

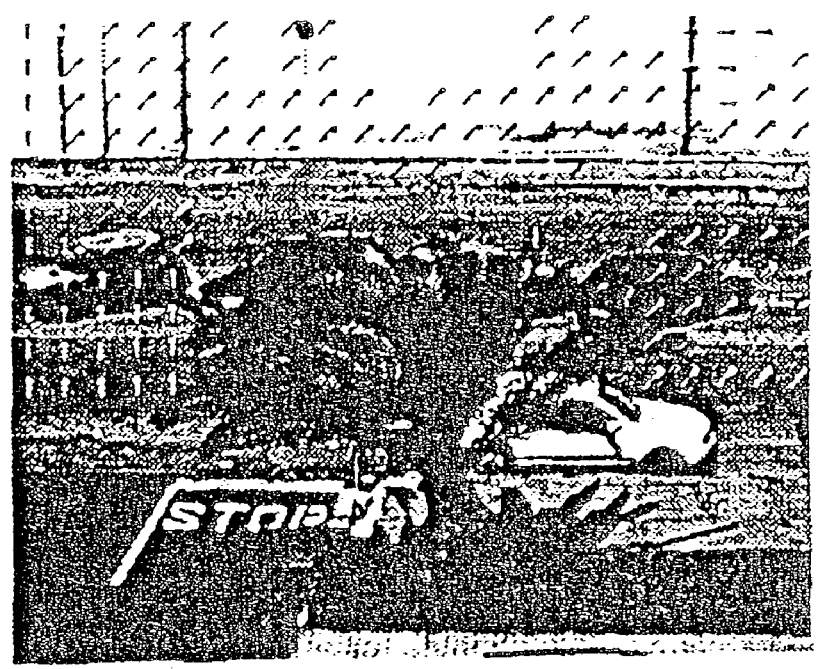
Figure 7B, Input Frame with Background BMVs

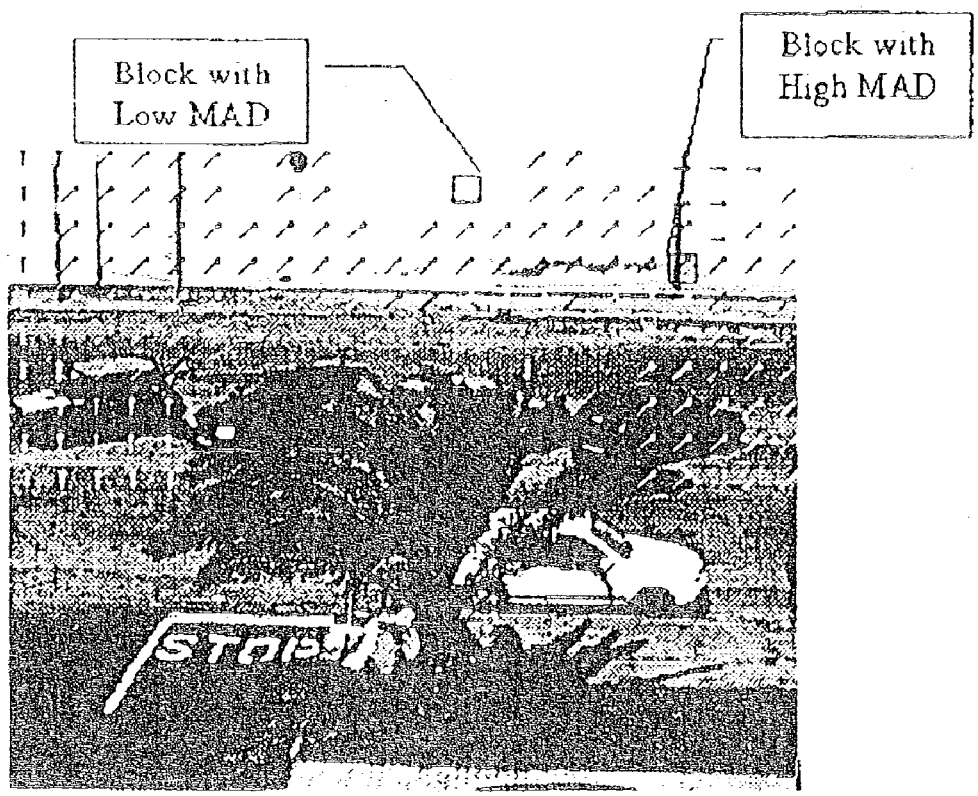
Figure 8, Different MAD values for image blocks

METHOD OF STABILIZING AN IMAGE SEQUENCE

FIELD OF THE INVENTION

The present invention is concerned with digital image processing and, more particularly, regards a method of stabilizing a sequence of digital images.

BACKGROUND OF THE INVENTION

Digital images are nowadays used in many different applications, a case in point being such traditional acquisition devices as digital still and video cameras. One must also expect an ever greater use of digital images in devices of the new generation, for example, in mobile multimedia communication terminals.

There exist numerous devices or applications that use digital images acquired in sequence, i.e., images acquired with a brief time interval between one image and the next and representing approximately one and the same real scene.

The acquisition rate of the sequence, i.e., the number of images acquired in a given time interval, may vary in accordance with the specific applications; for example, the rate will be very high in digital video cameras (about 25 images per second) and lower in mobile communication terminals (about 15 images per second) that acquire the digital images and transmit them in real time to a remote terminal. The number of digital images comprised in the sequence can likewise vary within wide limits: for example, the sequence may contain a large number of images (video sequence), but there are also many known specific applications of digital photography for which it is sufficient to acquire sequences containing just a few images (two or three, for example).

It is known that the image sequences are often affected by unwanted displacements/motions between images produced in the acquisition phase. Such unwanted motions may be due to, for example, vibrations, fluctuations or micro-oscillations of the acquisition device during the acquisition of the sequence.

There are numerous known compensation or correction techniques intended to reduce or eliminate these unwanted motions.

When digital sequences are acquired for generic video applications, the techniques for compensating these unwanted motions are commonly known by the name of stabilization techniques. In particular, the stabilization of video sequences plays an important part, because—as is well known to persons skilled in the art—it not only eliminates unpleasant oscillations and vibrations that would be observable in the reproduction of these sequences (a film, for example), but also makes it possible to obtain a greater compression efficiency when the sequences are encoded by means of encoding/compression techniques that operate, for example, in accordance with the MPEG standard or the H263 standard and are nowadays extensively used in the greater part of the available commercial devices.

Conventionally, the stabilization techniques correct the acquired sequence after a phase of estimating the relative motions between image pairs of the sequence. This phase, which will hereinafter be referred to as the motion estimation (or Mot_Est) phase, produces an estimation of the motion of the sequence by evaluating, for example, the motion of each image of the sequence with respect to a reference image.

In particular, techniques of estimating the motion between a first and a second image that use a motion model on the basis of which the second image corresponds substantially to a rigid rotation/translation of the first image are known by the name of "global motion" techniques. Commonly, the motion model is further simplified and in actual fact the global motion estimation produces an estimate of the relative motion/misalignment between a pair of images in the form of a global motion vector with a vertical translation component and a horizontal translation component.

On the other hand, techniques that characterize the relative motion between a pair of images in the form of a plurality of relative motions between corresponding portions of the pair of images are known as "local motion" estimation techniques. These techniques produce a plurality of local motion vectors (with, for example, vertical and horizontal translation components), each of which is associated with a particular portion of the image.

Though satisfactory in many different respects, the known image sequence stabilization techniques are associated with numerous drawbacks and problems bound up with, among others, inadequate performance, complex computations or implementation costs of such an order as to make it difficult to employ them in commercial portable acquisition devices.

BRIEF SUMMARY OF THE INVENTION

The present invention therefore provides a sequence stabilization method and apparatus. According to principles of the present invention, a method for stabilizing a sequence of images is carried out in phases. In one phase, a first global motion vector is estimated. The global motion vector has associated therewith a first motion component in a first direction. This first motion component will have first respective amplitude and the first vector will be representative of the motion with respect to a reference image portion within an entire first image. Thereafter, the first motion component is associated with either a wanted motion or an unwanted motion. The first component is compensated for when it is associated with an unwanted motion. The determination as to whether the motion is unwanted motion or wanted motion is based on comparing the amplitude with the threshold, and if the amplitude is smaller than the threshold, then it is determined to be unwanted motion and when the amplitude is greater than a first threshold, it is wanted motion.

The modification of the horizontal/vertical motion components that exceed their respective threshold values makes it possible to avoid the drawback of an indefinite growth of these components and gives rise to the further advantage of rendering the stabilization method capable of reacting quickly to unwanted movements of small amplitude that occur between wanted motions that may sometimes be of considerable duration.

Advantageously, moreover, the subdivision of the image into a region that represents the background and a region that represents the foreground makes it possible to obtain a motion estimation and an image stabilization that will be optimized in relation to the image content.

The possibility of choosing predefined and even partially superposed background and foreground regions also makes it possible for the stabilization method to be applied in a very flexile manner to sequences of various sizes and in which these regions are arranged in many different ways. It should be noted that this superposition does not imply any additional computation cost, because the weighting coefficients W and the block motion vectors BMV still have to be calculated only once for regions that form part of both blocks.

BRIEF DESCRIPTION OF THE SEVERAL VIEWS OF THE DRAWINGS

Further characteristics and advantages of the invention will be brought out more clearly by the detailed description about to be given of a preferred embodiment thereof, which is to be considered as an example and not limitative in any way, said description making reference to the attached drawings of which:

FIGS. 6A and 6B show the variations in time of the motion vectors of an image sequence.

FIGS. 7A & 7B show a further example of the invention.

FIG. 8 is an example of the application of the invention.

DETAILED DESCRIPTION OF THE INVENTION

The preferred embodiment of the present invention concerns a portable device capable of acquiring digital images for video applications and, more particularly, the stabilization of an image sequence in a digital video camera.

In this connection it should be noted that the teachings of the present invention can be extended also to applications other than those explicitly mentioned in the description about to be given, for example, to image sequences acquired in mobile multimedia communication terminals of the new generation.

Figure 1:
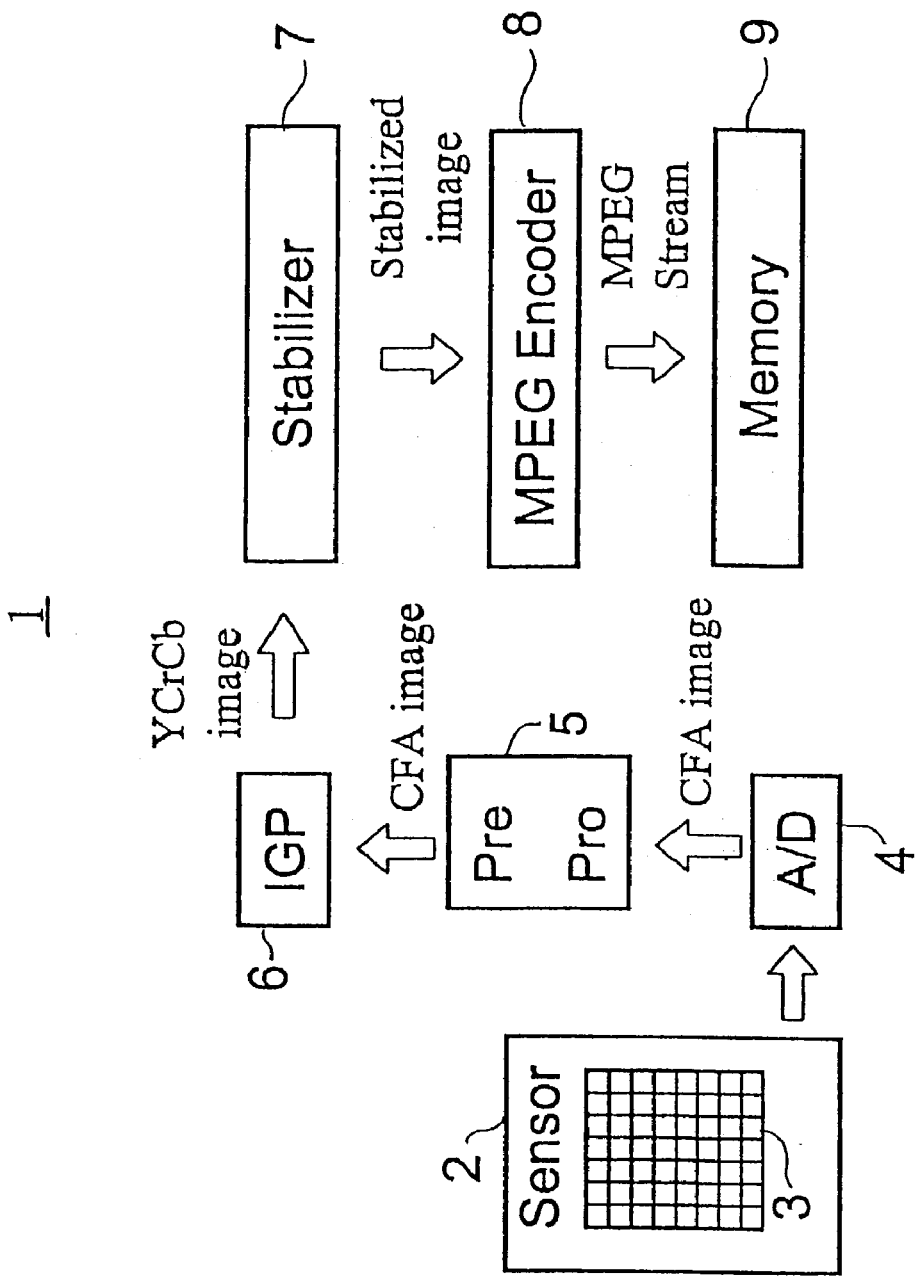
FIG. 1 shows the block diagram of a possible acquisition device that implements a stabilization method in accordance with the present invention, FIG. 2 schematically illustrates the succession the three principal phases of a stabilization method.

Albeit in a very schematic manner, FIG. 1 shows the function blocks of a digital video camera 1. The video camera 1 includes an acquisition block 2 comprising an optical sensor 3.

The sensor 3, which may either a CCD (Charge Coupled Device) or a CMOS (Complementary Metal Oxide Semiconductor), is an integrated circuit comprising a matrix of photosensitive cells, each of which serves to generate an electric signal proportional to the quantity of light that strikes it during the acquisition interval.

In a preferred embodiment the sensor 3 comprises an optical CFA (Color Filter Array) filter, for example, a Bayer filter. As is well known to persons skilled in the art, in a sensor with a CFA filter only a single photosensitive cell is available for acquiring a pixel. The sensor is covered by an optical filter constituted by a matrix (a Bayer matrix, for example) of filtering elements, each of which is associated with a photosensitive cell. Each filtering element transmits to the photosensitive cell associated with it the light radiation corresponding to the wavelength of only red light, only green light or only blue light, so that for each pixel it detects only one component (of which it absorbs no more than a minimal part).

The video camera 1 also includes an analog/digital (A/D) conversion block, indicated by the reference number 4, to translate the generated electric signal into a digital value with a predetermined number of bits (generally 8, 10 or 12 bits). One may assume, solely by way of example and without thereby introducing any limitation whatsoever, that in the present invention the A/D converter 4 is such as to encode the incoming analog signals with eight-bit digital values. In that case the digital values of the pixels will be comprised between a minimum binary value equal to 0 and a maximum binary value equal to 255.

On the output side of the A/D block 4 the digital image is in CFA format, since each pixel is constituted by just a single chromatic component (R, G or B). For this reason, a one-byte single digital value is associated with each pixel.

A pre-processing (PrePro) block 5, active before and during the entire acquisition phase, is such as to interact with the acquisition block 2 and to extract from the CFA image a number of parameters useful for carrying out automatic control functions: self-focusing, automatic exposure, correction of sensor defects and white balancing.

A block 6, the so-called IGP (Image Generation Pipeline) block, is designed to perform a processing phase that, starting from the digital CFA image, will produce a complete digital image—YCrCb format, for example—in which each pixel will have associated with it three digital values (i.e., a total of 24 bits) corresponding to a luminance component Y and two chrominance components Cr and Cb. This transformation, obtained—for example—by means of interpolation, involves a passage from a representation of the image in a single plane (Bayer plane), though containing information relating to different chromatic components, to a representation in three planes.

In digital still cameras the IGP block is commonly realized in the form of a dedicated processor (CFA processor), which may be, for example, in VLSI (Very Large Scale Integration) technology.

Preferably, the IGP block 6 is also such as to perform various functions for improving the quality of the image, including, for example, filtering the noise introduced by the sensor 3, applying special effects and other functions that will generally vary from one producer to another.

Without thereby introducing any limitation, the video camera 1 preferably comprises a stabilizer block 7 that follows the IGP block 6 and is intended to perform the operations relating to the stabilization method in accordance with the present invention, so that its output will consist of a stabilized sequence of digital images.

This is followed by a compression/encoding block 8, which in this example is of the MPEG type (but could also be of other types, H263 for example), and a memory unit 9.

When shooting a video sequence with the video camera 1, the sequence images are acquired consecutively by means of the acquisition block 2, preferably within a brief time interval between one image and the next. The MPEG-4 standard, for example, requires fifteen images to be acquired per second.

Hereinafter we shall use $Img_1$, $Img_2$, $Img_3$, . . . , $Img_{n-1}$, $Img_n$, $Img_{n+1}$ . . . to indicate the images acquired in sequence: $Img_1$ represents the first image of the sequence to be acquired, $Img_2$ represents the second image, and so on.

Following acquisition, each image is passed to the subsequent blocks, so that in all the subsequent processing phases the images will still be processed consecutively.

The micro-oscillations of the video camera 1 due to involuntary micro-motions of the user's hand between one acquisition and the next will generate image sequences affected by unwanted motions. It should be noted that conventionally the sequence may also contain motions purposely introduced by the operator. During the acquisition of a scene, for example, the operator may want to enlarge or reduce the field of view (zooming), or he may voluntarily move the camera to obtain a panoramic view or follow a moving personage (panning).

Once it has been acquired, each image of the sequence is converted into digital values by the A/D converter 4 and then processed by the pre-processing block 5.

After leaving the pre-processing block 5, each image in CFA format is sent to the IGP block 6. In this block the image is subjected to an interpolation phase and is thus transformed into a complete image, for example, in YCrCb format.

The interpolation phase may be performed, among others, with methods that are know to a person skilled in the art and are therefore obvious from the previous description.

The interpolated image in YCrCb format is then sent to the stabilizer block 7, where it undergoes processing phase by means of a stabilization method in accordance with the present invention. This processing phase produces a stabilized image as its output.

It should be noted that when an image has to be stabilized, it is conventionally required that the unwanted motions (jiggling) should be corrected/compensated, but without eliminating the motions voluntarily introduced by the operator (panning/zooming).

The choice that the stabilizer block should operate on an image in YCrCb format constitutes a preference and is not limitative for the purposes of the present invention. Nor is the fact that the stabilization method operates on interpolated to be considered as limitative: as will subsequently be explained, a possible alternative consists of applying the stabilization methods to images in CFA format.

Following stabilization, each image is sent to the MPEG encoder block 8, which produces as its output a sequence or stream of images encoded/compressed in accordance an MPEG-type encoding.

The MPEG stream of compressed images may be registered in a memory unit 9 or sent or sent to an external peripheral device.

Figure 2:
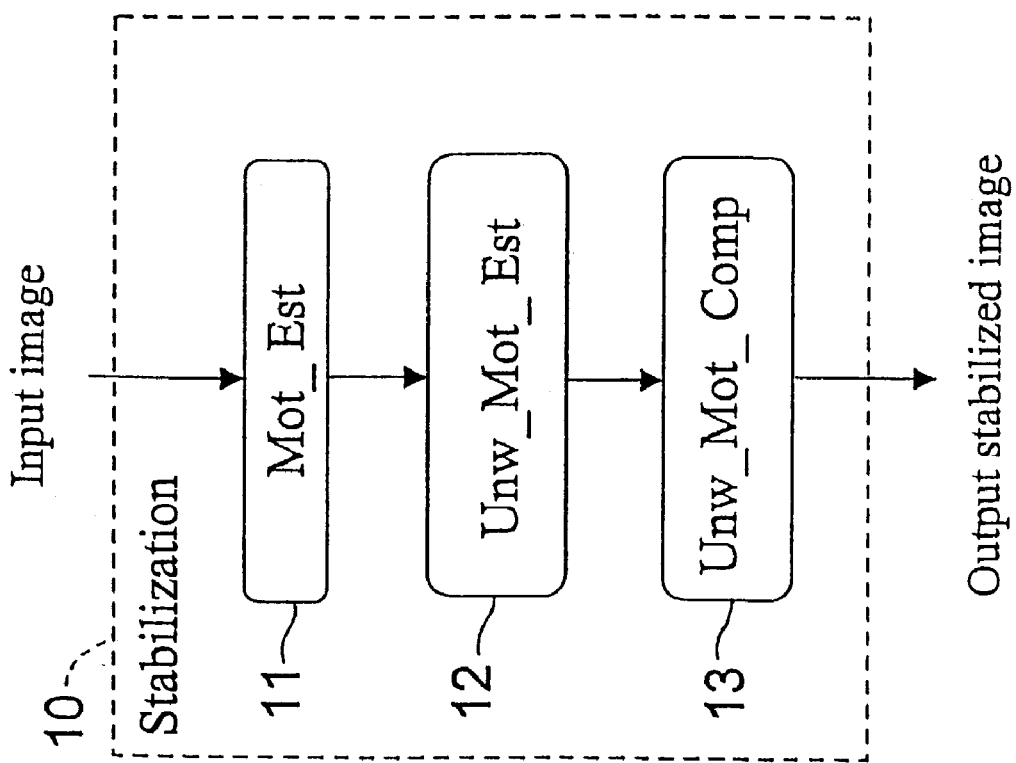

As shown in FIG. 2, in a preferred embodiment the stabilization method 10 performed in the stabilizer block 7 comprises substantially three successive phases, namely: a first phase 11 of motion estimation ("Mot_Est"), a second phase 12 of unwanted motion estimation ("Unw_Mot_Est"), and a third phase 13 of unwanted motion compensation/correction ("Unw_Mot_Comp").

The first phase 11 of motion estimation (Mot_Est) is such as to estimate the motion between images of the sequence.

The motion estimated by this phase may be due either to a voluntary motion of the operator or to an unwanted motion.

Figure 3:
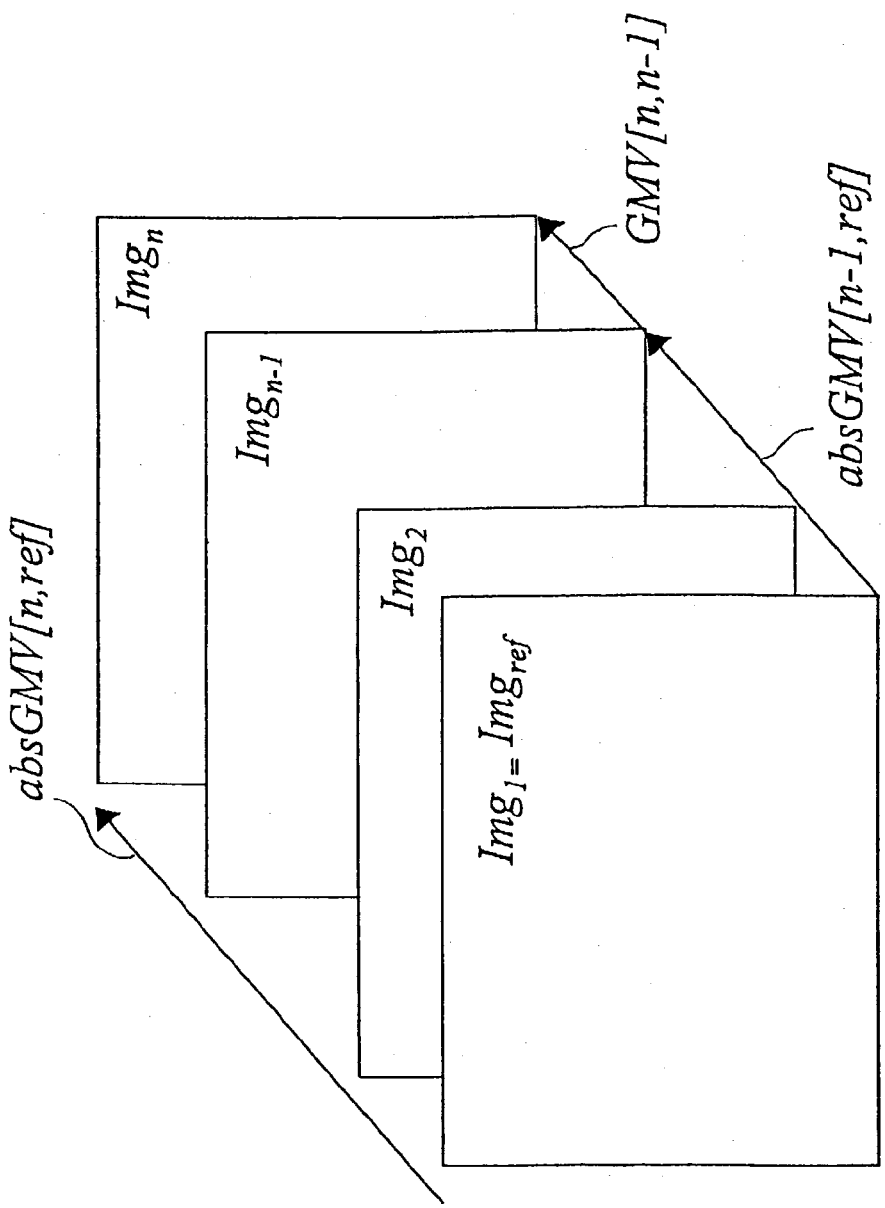
FIG. 3 shows an image sequence, FIG. 4 schematically illustrates the succession of the principal phases of a motion estimation method.

Referring now to FIG. 3, in a preferred embodiment the motion estimation phase 11 produces an absolute vector of global motion absGMV[n,ref] that comprises a translation component in the horizontal direction $absGMV_X[n,ref]$ and a translation component in the vertical direction $absGMV_Y[n,ref]$.

The absolute global motion vector absGMV[n,ref] represents the estimation of the translation motion of the input image $Img_n$ with respect to a previous image of the sequence $Img_{ref}$, which is considered as the reference image. For the sake of simplicity, we may here assume that the reference image is initially the first image of the acquired sequence, so that in practice $Img_{ref}=Img_1$.

Preferably, the estimate absGMV[n,ref] of the absolute global motion vector of an input image $Img_n$ with respect to the reference image $Img_{ref}$ is produced by estimating a global motion vector GMV[n,n−1] of the input image $Img_n$ with respect to the image $Img_{n−1}$ that immediately precedes it and then adding this vector to the absolute global motion vector absGMV[n−1,ref] estimated for the previous image $Img_{n−1}$.

Put in mathematical language, for each input image $Img_n$ the Mot_Est phase produces an output vector:

$$absGMV[n,ref]=GMV[n,n-1]+absGMV[n-1,ref].$$

Returning now to FIG. 2, the second phase 12, which estimates the unwanted motion, is such as to produce for each image $Img_n$ an estimate of the unwanted motion by starting from the absolute global motion vector absGMV[n,ref] estimated in the first Mot_Est phase 11.

Lastly, a third phase 13 is such as to process the input image $Img_n$ in such a manner as to compensate the unwanted motion on the basis of the estimate of this motion produced in the second Unw_Mot_Est phase 12.

As already noted, the problem of estimating the motion of the Mot_Est phase 11 is therefore that of estimating a global motion vector between consecutive images of the sequence.

For a given input image $Img_n$, this global motion vector can be advantageously estimated by starting from the estimation of a plurality of block motion vectors, each associated with a respective sub-block of image pixels.

Figure 4:
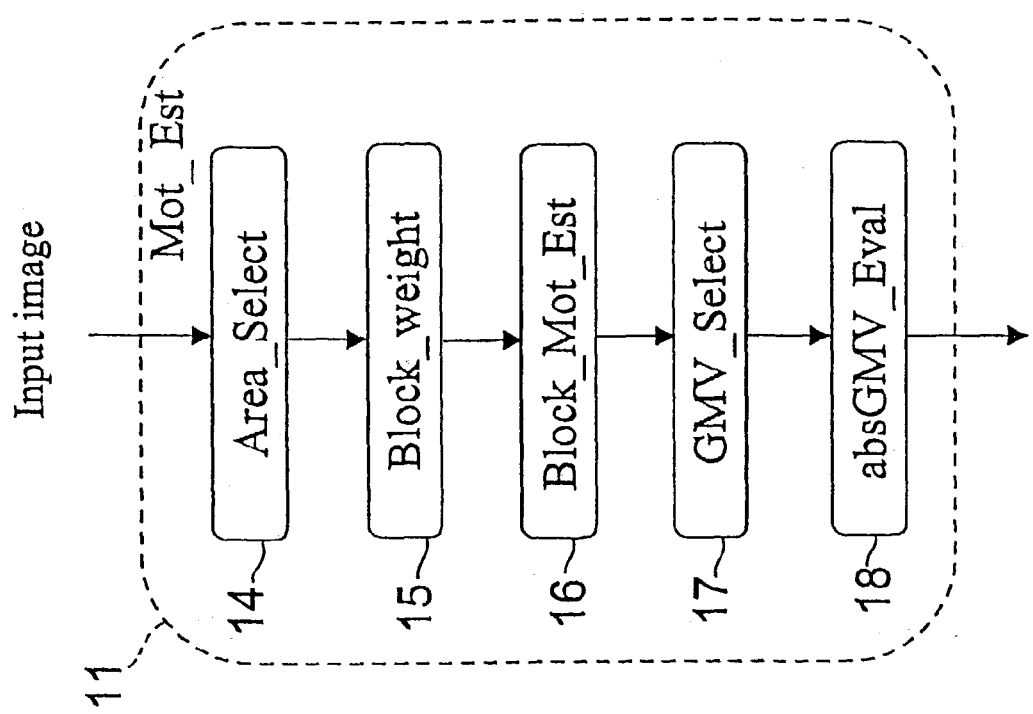

With the help of FIG. 4, we shall now describe in greater detail a particularly advantageous embodiment of the motion estimation phase 11.

Figure 5:
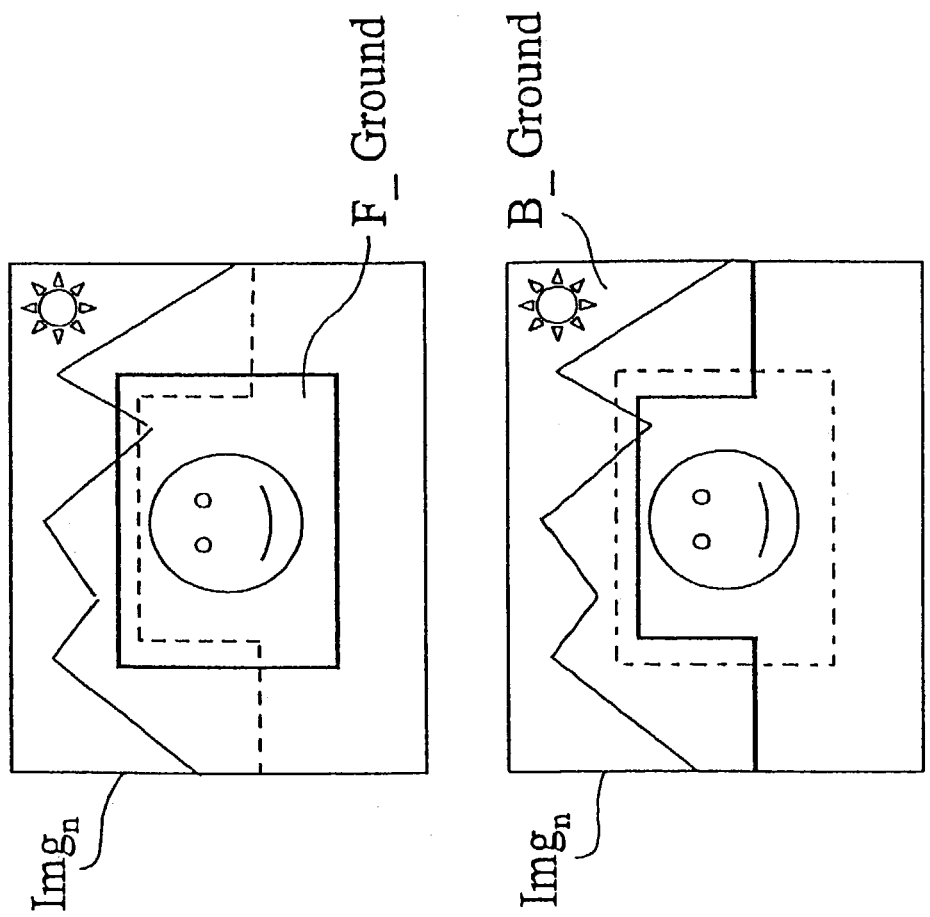
FIG. 5 shows a possible subdivision of an image into a background region and a foreground region.

In particular, the motion estimation phase 11 comprises preferably an "area select" phase 14 in which there are selected two regions of the image $Img_n$: a first region "B_Ground," which represents the background of the scene reproduced by the image $Img_n$, and a second region "F_Ground," which represents the foreground of the scene (see FIG. 5).

As shown in FIG. 5, the two regions may even be partially superposed and is not necessary that, taken together, they should cover the whole of the image.

As will be explained later, this preliminary subdivision makes it possible to formulate the stabilization strategy. For example, if the subject is in the foreground and substantially in a fixed or only slowly variable position, the image may be stabilized by correcting the unwanted motions (essentially due to vibrations of the video camera) after having estimated this motion by means of the oscillations that can be observed in the background of the image, i.e., by studying the motion of the background region.

But there is also another type of unwanted motion due to the presence of a subject moving rapidly across the scene. In that case the person shooting the scene will probably not be able to appropriately "follow" the subject. In this case, which persons skilled in the art are wont to refer to as "tracking," the stabilization is performed by correcting the undesired motion after having estimated it on the basis of the motions that can be observed in the foreground.

When shooting real scenes, the foreground is usually situated in a substantially central portion of the image, while the background is situated in the lateral and upper parts of the frame, and in a preferred embodiment the Area_Select phase could therefore select the B_Ground and F_Ground regions in a predetermined manner, for example, in the precise manner shown in FIG. 5.

In a variant that calls for a greater computation effort, but also provides an optimized performance, the selection of the regions representing the foreground and the background could be made in a dynamic and adaptive manner.

In yet another alternative embodiment the Area_Select phase 14 of the stabilization method could select the foreground and background regions, for example, in such a manner as to be exactly superposed on each other, i.e., turn them into a single region that will represent either the background or the foreground according to a user pre-selected stabilization strategy.

Hereinafter, though without thereby introducing any limitation, we shall refer to the case in which the Area_Select phase selects the two regions in a predetermined manner in accordance with the preferred subdivision shown in FIG. 5.

As shown in FIG. 4, the Mot Est phase 11 also comprises a weight calculation phase 15 indicate in the figure as "Block_Weight." In this phase the B_Ground and F_Ground regions are subdivided into sub-blocks of pixels, to which we shall hereinafter refer also with the simpler term of blocks. These blocks may be, for example, small square blocks of size 8×8, 16×16, 32×32. It is, of course, also possible to make different choices as regards the size and the shape of the blocks. It will however be advantageous to make sure that the number of pixels in each block is small as compared with the size (the number of pixels) of the image.

As has already been noted, the two regions may be partially superposed, and some of the blocks could therefore form part of both the regions.

The weight calculation phase 15 sets out to associate with each block of the foreground and background regions a respective weighting coefficient W that is correlated with some inhomogeneity measure and, for example, will become greater as the inhomogeneity of the block increases. For example, a block B1 that is wholly homogeneous will be assigned a weighting coefficient W1 equal to 1 (unity). A block B2 less homogeneous than block B1 will be assigned a weighting coefficient W2 greater than one.

The inhomogeneity of a block represents the lack of uniformity existing between one or more parameters associated with the pixels of that same block and is therefore correlated with the spectral content of the block in the spatial frequency domain.

The phase of evaluating the inhomogeneities, just like the phase of calculating the block weights, serves to identify the blocks that, given their particular characteristics, can provide information about the global motion of the image $Img_n$ and possibly also serves to discard the blocks that are not very representative of the global motion of the image. In fact, the estimate of the motion of a substantially homogeneous block (i.e., a block with only small inhomogeneity) could be affected by a substantial error, especially when the block is situated similarly homogeneous portion of the image. For this reason, the estimate of the motion of such a block can provide completely misleading information about the global motion of the image.

Vice versa, a block with high-frequency components (for example: a block that has been appropriately focused and contains neat sides or clean-cut edges) can potentially provide very reliable information about the global motion of the image.

In a preferred embodiment the evaluation of the inhomogeneity of a block is performed by measuring the inhomogeneity of the luminance component Y of the pixels forming part of the block, since this is the component of the image for which the human eye has the greatest sensitivity.

In an alternative embodiment the estimate of the inhomogeneity could be carried out on images that have not yet been interpolated, possibly in Bayer CFA format, taking into consideration the pixels of a green color. The reason for this choice is that in this format the green pixels are more numerous than the others and the green component is therefore representative of the luminance information to within a good approximation.

It should however be noted that other pixel parameters may also be used for measuring the inhomogeneity, the chromatic content being a case in point.

An inhomogeneity measure can be obtained, for example, by calculating the variance of the block or, more particularly, the variance of the luminance values of the pixels of the block. For example, given a block of size 16×16, the number of luminance values to be taken into consideration is 64. The greater the variance, the greater will be the inhomogeneity and therefore the weighting coefficient W to be associated with the block.

The variance can be calculated as:

$$\sigma = \sqrt{\frac{\sum_{i,j}(Y_{i,j}-m)^2}{N}}$$

where $Y_{ij}$ is the luminance value of the pixel having the coordinates (i,j) in the block under consideration, m is the average luminance of the pixels of the block and N is the number of pixels in the block.

According to a preferred embodiment that implies a comparatively small computation effort, the inhomogeneity is estimated by calculating the mean absolute difference MAD:

$$MAD = \frac{\sum_{i,j}|Y_{i,j}-m|}{N}.$$

In the present invention the homogeneity is preferably also evaluated by calculating the "activation" A, which is a measure of the difference that exist between adjacent pixels both in the horizontal and in the vertical direction. In mathematical terms:

$$A = A_{hor} + A_{vert}$$

where $A_{hor}$ is the horizontal activation and is given by:

$$A_{hor} = \sum_{i,j}|Y_{i,j+1} - Y_{i,j}|$$

while $A_{vert}$ is the vertical activation and is given by:

$$A_{vert} = \sum_{i,j}|Y_{i+1,j} - Y_{i,j}|.$$

Advantageously, the calculation of this measure does not call for a great computational effort. Furthermore, the activation measure values the presence of both horizontal and vertical edges or transitions more accurately than the two previously described measures and is therefore particularly suitable for characterizing the inhomogeneity of a block.

Without thereby introducing any limitation whatsoever, the remainder of the present description will refer to the particular case in which the activation A is used as the inhomogeneity measure.

Once the activation has been calculated, a weighting coefficient W can be associated with each block. The table below illustrates an example of a possible association methodology:

| Activation | W |
|---|---|
| 0 < A < 10 | 1 |
| 10 ≦ A < 500 | 2 |
| 500 ≦ A < 1000 | 4 |
| 1000 ≦ A < 2000 | 8 |
| 2000 ≦ A < 4000 | 16 |
| A ≧ 4000 | 32 |

As shown by this table, the weighting coefficients W are assigned according to the range of values within which the calculated activation is comprised.

Preferably, the processing operations of the subsequent phase of estimating the global motion vector of the image $Img_n$ will take into consideration only the blocks that have an inhomogeneity greater than a predetermined value o or, more particularly, only blocks having a weighting coefficient W greater than a predetermined threshold value $W_{th}$, for example, equal to 2. For the sake of simplicity, these blocks will henceforth be referred to as "above-threshold" blocks.

More particularly, the Mot_Est phase comprises—as shown in FIG. 4—a further phase 16, described as Block_Mot_Est, that associates with each block of the image $Img_n$ that has an above-threshold coefficient a respective block motion vector BMV that represents the translation motion that the block in question has undergone in passing from the previous image $Img_{n-1}$ to the present image $Img_n$.

In accordance with the present invention, any appropriate method known to the state of the art may be used for determining a motion vector BMV to be associated with a given block.

On account of the advantages it provides in terms of reliability and computational simplicity, the algorithm described in EP 1 139 699 A1 and the article "An innovative, high quality and search window independent motion estimation algorithm and architecture for MPEG-2 encoding," F. S. Rovati et al., *IEEE Transactions on Consumer Electronics*, Vol.46, No.3, August 2000, will preferably be employed for this purpose. It is noted that the EP 1 139 669 A1 reference is not being incorporated by reference herein.

The conventional algorithm for estimating the block motion employed in the MPEG encoder of the video camera 1 may also be advantageously used in the method in accordance with the present invention.

Once a respective block motion vector BMV has been obtained for each above-threshold block, a phase 17, known as GMV_Select, selects from among all the block motion vectors BMV the particular block motion vector BMV that is most representative of the global motion of the image $Img_n$ with respect to the previous image $Img_{n-1}$.

To this end, starting from the weighting coefficients W and the block motion vectors BMV associated with the above-threshold blocks of the background region B_Ground, the phase calculates a global motion vector B_GMV representative of the motion of the background region.

Similarly, starting from the weighting coefficients W and the block motion vectors BMV associated with the above-threshold blocks of the foreground region F_Ground, the phase calculates a global motion vector F_GMV representative of the motion of the foreground region.

Preferably, the global motion vector B_GMV representative of the motion of the background region B_Ground will be calculated by constructing a bi-dimensional histogram of the block motion vectors BMV of the above-threshold blocks of the background region. In this histogram each block "votes" for its associated block vector BMV with the weighting coefficient W assigned to it.

The phase then selects from among the possible block motion vectors the one that has received the largest number of "votes," i.e., the one that produces a peak in the histogram. Let us consider, for example, the case in which a block B1 of the background region B_Ground has had associated with it a block motion vector BMV with a horizontal component $BMV_X=-1$ (i.e., translation towards the left of 1 pixel), a vertical component $BMV_Y=1$ (i.e., up-translation of 1 pixel) and a weighting coefficient W=4, and let us suppose that for other above-threshold blocks B2, B3, . . . , all forming part of the background region B_Ground, the associated block motion vectors and weighting coefficients are as shown in the following table:

| | $BMV_X$ (pixel) | $BMV_Y$ (pixel) | W |
|---|---|---|---|
| B1 | −1 | 1 | 4 |
| B2 | 1 | 0 | 8 |
| B3 | −1 | 1 | 16 |
| B4 | 0 | 0 | 4 |
| B5 | 2 | 1 | 8 |
| B6 | 0 | 0 | 4 |
| B7 | −1 | −1 | 8 |

Given the data shown in this table, the bi-dimensional histogram, when expressed in the form of a table, will be as follows:

| B_GMV | | Horizontal motion (X) | | | | |
|---|---|---|---|---|---|---|
| Vertical | | −2 | −1 | 0 | 1 | 2 |
| motion | 2 | — | — | — | — | — |
| (Y) | 1 | — | 4 + 16 | — | — | 8 |
| | 0 | — | — | 4 + 4 | 8 | — |
| | −1 | — | 8 | — | — | — |
| | −2 | — | — | — | — | — |

In this case the motion vectors B_GMV of the background region is the motion vector BMV=(−1,1), because this is the vector that in the histogram has accumulated a sum of weighting coefficients W greater than any other.

It should also be noted that a two-dimensional histogram is not generally equivalent to two one-dimensional histograms of, respectively, the horizontal motion component and the vertical motion component. This is due to the fact that the correlation between the horizontal and vertical motion components is lost when two separate histograms are used. At times this loss will lead to an incorrect result.

The motion vector F_GMV representative of the motions of the foreground region F_Ground is calculated in a similar manner.

Lastly, the GMV_Select phase assigns to the image $Img_n$ a global motion vector GMV[n,n−1] by selecting one of the two global motion vectors F_GMV and B_GMV calculated for the two regions as explained above.

With a view to performing this selection operation, it counts the number N1 of the blocks with which the Mot_Est phase associated a motion vector equal to the global motion vector B_GMV chosen—by means of the histogram—as being representative of the motion of the background B_Ground.

Similarly, it will count the number N2 of blocks of the foreground region F_Ground with which the Block_Mot Est phase associated a motion vector equal to the global motion vector F_GMV chosen—by means of the histogram—as being representative of the motion of the foreground F_Ground.

The GMV_Select phase 17 selects the global motion vector of the background region B_Ground if N1 is greater than N2, and vice versa in the contrary case. In this case one thus has $$GMV[n,n-1]=B\_GMV,$$

while in the contrary case on has $$GMV[n,n-1]=F\_GMV$$

Advantageously, rather than being actually counted, the numbers N1 and N2 can be estimated to within a good approximation by means of the following formulas:

$$N1 = \frac{NB_{B\_Ground}}{TW_{B\_Ground}} I_{B\_Ground}[B\_GMV]$$

where $NB_{B\_Ground}$ is the number of above-threshold blocks in the background region B_Ground, $TW_{B\_Ground}$ is the sum of all the values in the histogram (i.e., the sum of all the weighting coefficients associated with above-threshold blocks of the background region), and $I_{B\_Ground}[B\_GMV]$ is the histogram value of the vector B_GMV, i.e., the peak value of the histogram.

Similarly, the phase estimates:

$$N2 = \frac{NB_{F\_Ground}}{TW_{F\_Ground}} I_{F\_Ground}[F\_GMV].$$

When the numbers N1 and N2 are estimated as shown above, one obtains an optimization of the necessary memory resources or an analogous computational saving, because the calculation is entirely based on data already contained in the histograms.

Once the vector GMV[n,n−1] representative of the motion of the motion of the image $Img_n$ with respect to the image $Img_{n-1}$, has been calculated, a final phase 18, designated as absGMV_Eval, of the motion estimation phase 11 calculates the absolute motion absGMV[n,ref] of the image $Img_n$ with respect to the image $Img_{n-1}$ of the sequence as previously explained.

On completion of the motion estimation phase 11, unwanted motion estimation phase 12 (Unw_Mot_Est) estimates the unwanted motion from the absolute global motion vector absGMV[n,ref] of the image $Img_n$.

Going into greater detail, the two translation components in the horizontal and the vertical direction of the absolute global motion vector of the image $Img_n$ are taken into individual consideration in this phase, because there exists the possibility, for example, that estimated movement in the vertical direction is due to vibration (jiggling) and therefore unwanted, whereas the motion in the horizontal direction is due a panoramic shot (panning) and has therefore been purposely introduced by the operator.

It has been noted that undesired motion having the characteristics of a random vibration will typically have a small amplitude and a zero mean value as compared with the reference image (because it rapidly changes direction).

Purposely introduced motion, on the other hand, can attain large amplitudes and maintain the same direction for a long time. One need only think, for example, of the case in which the operator acquires a sequence by swiveling the camera around himself and always in the same direction. In some cases such voluntary movements could even grow indefinitely and cause a situation of arithmetic overflow, i.e., grow to a value that exceeds the largest number that can be represented by the memory quantity reserved therefor.

For the sake of simplicity, we shall henceforth describe the unwanted movement estimation phase 12 with sole reference to the motion component of the image $Img_n$ in the horizontal direction. The manner in which the component in the vertical direction is estimated will be rendered obvious by this description.

In the unwanted motion estimation phase Unw_Mot_Est it will be advantageous if the horizontal component $absGMV_X$[n,ref] of the absolute global motion vector absGMV[n,ref] estimated for the image $Img_n$ is compared with a predetermined threshold value, which we shall henceforth refer to as the as the horizontal compensation threshold $$T_{comp}^{hor}.$$

If the horizontal component $absGMV_X$[n,ref] has an amplitude smaller—the amplitude to be considered being that of the module—than the compensation threshold $$T_{comp}^{hor},$$

the horizontal component is associated with an unwanted motion, i.e., it is established that the horizontal motion component is due to an undesired motion. Otherwise the horizontal motion is associated with a purposely introduced motion.

A horizontal component associated with an undesired motion activates the subsequent unwanted motion compensation (or Unw_Mot_Com) phase 13, which horizontally translates the image $Img_n$ in the direction opposite to that of the horizontal component and by a number of pixels equal to the amplitude of the horizontal component $Img_n$, of the absolute global motion vector.

On the other hand, when the horizontal component $absGMV_X$[n,ref] has an amplitude greater than or equal to the compensation threshold, the motion is considered to be voluntary and the subsequent unwanted motion compensation phase 13 is not activated for the horizontal component, on which there is imposed the value $$|absGMV_X[n, ref]| = T_{comp}^{hor}.$$

The absolute motion vector is thus modified by making the amplitude of the horizontal component associated with a voluntary motion equal to the horizontal compensation threshold. In other words, its amplitude is fixed at a value that coincides with the compensation threshold.

This has the advantage of making it possible to avoid this amplitude growing indefinitely when the horizontal motion component maintains the same direction for a long period of time.

In this case, when the next image $Img_{n+1}$ is being stabilized, the motion estimation phase 11 will estimate the horizontal component of the absolute global motion vector of the image $Img_{n+1}$ by means of the following formula:

$$absGMV_X[n+1, ref] = GMV_X[n+1, n] + absGMV_X[n, ref] = \\ = GMV_X[n+1, n] + T_{comp}^{hor}.$$

When the amplitude of the horizontal component $absGMV_X[n+1,ref]$ calculated in this manner is smaller than the compensation threshold $$T_{comp}^{hor},$$

the horizontal motion component $GMV_X[n+1,n]$ is interpreted as an unwanted horizontal vibration, because its direction is contrary to the direction of the wanted motion, and the compensation phase 13 is therefore activated.

It should be noted that this method of estimating the unwanted motion will also interpret the initial part of a voluntary motion as an unwanted motion (and will therefore correct/compensate it) until the compensation threshold is exceeded. Once this critical point has been passed, the remainder of the wanted motion is correctly interpreted and will not therefore be corrected/compensated. In any case, the erroneously corrected/compensated part of such a voluntary motion would be negligible, because these motions—by their very nature—are normally very extensive.

FIGS. 6A and 6B illustrate the variations in the course of time of the horizontal components of the absolute motion vectors of an image sequence. In particular, FIG. 6A shows the variations in time of the horizontal components of the absolute motion vectors that would be observed on the output side of the Mot_Est phase if the horizontal components having an amplitude greater than or equal to the compensation threshold were not to be modified.

FIG. 6B, on the other hand, illustrates the time behavior of the absolute motion vectors after they have been modified in phase 13, the Unw_Mot_Comp phase. As can be seen, the component having an amplitude greater than the threshold are modified in such a way as to have an amplitude equal to the threshold. In FIG. 6B the horizontal motion is interpreted as unwanted as far as image $Img_{n-1}$. But from image $Img_n$ onwards and as far as image $Img_{n+3}$ the motion is interpreted as wanted. From image $Img_{n+4}$ onwards, lastly, it is again interpreted as unwanted.

Preferably, the method in accordance with the present invention will be such as to provide for the compensation threshold—in this case horizontal—to be adaptively modified on the basis of its previous history. Indeed, should it be noted that wanted motion predominates in the estimated horizontal motion, so that compensation/correction is applied only rarely (i.e., few images are being stabilized), the horizontal compensation threshold will be raised, thus rendering the method more sensitive to unwanted horizontal motions. But when corrections/compensations predominate and wanted motion is only rarely detected, the threshold will be lowered.

Advantageously, moreover, the value of the absolute global motion vector can be reduced at the end of a wanted motion (for example, it can be made equal to the compensation threshold) in order to render the stabilization more efficient in detecting unwanted motions having opposite directions.

As already explained, the unwanted motions are compensated/corrected in the unwanted motion compensation phase 13.

In this phase, for example, the image $Img_n$ will be appropriately translated in the vertical/horizontal direction as previously described in order to compensate the unwanted motion.

As will be obvious to a person skilled in the art, the translation phase will preferably be followed by an appropriate phase of re-dimensioning the image $Img_n$, because the translation will cause a part of the image to be lost/discarded. An enlargement phase may also be introduced. These phases are already known, and for this reason need no further explanation here.

In actual practice the method of stabilization in accordance with the present invention has been found not only to furnish a reliable and robust estimate of the movement of a sequence, but also to be capable of appropriately distinguishing unwanted motions that have to be stabilized from purposely introduced motions.

As far as memory occupation is concerned, it should be noted that advantageously the information regarding the past history of the sequence motion is cumulatively contained in a single absolute global motion vector. It should also be noted that the discrimination between wanted and unwanted motions is obtained by means of a simple comparison with a threshold value and, consequently does not call for a considerable computation effort.

The modification of the horizontal/vertical motion components that exceed their respective threshold values makes it possible to avoid the drawback of an indefinite growth of these components and gives rise to the further advantage of rendering the stabilization method capable of reacting quickly to unwanted movements of small amplitude that occur between wanted motions that may sometimes be of considerable duration.

Advantageously, moreover, the subdivision of the image into a region that represents the background and a region that represents the foreground makes it possible to obtain a motion estimation and an image stabilization that will be optimized in relation to the image content.

The possibility of choosing predefined and even partially superposed background and foreground regions also makes it possible for the stabilization method to be applied in a very flexile manner to sequences of various sizes and in which these regions are arranged in many different ways. It should be noted that this superposition does not imply any additional computation cost, because the weighting coefficients W and the block motion vectors BMV still have to be calculated only once for regions that form part of both blocks.

Advantageously, the estimation of the of the motion vector representative of the motion of an entire image is obtained by using an inhomogeneity measure of image blocks suitable for evaluating the reliability of these blocks on the basis of their respective frequency contents. This measure, in particular, is used for selecting one of multiplicity of block motion vectors as representative of the image motion.

It should be noted that, thanks to the inhomogeneity characteristics of each block, the blocks that are not capable of providing reliable information about the image motion are discarded before the calculation of the block motion vectors, thus avoiding unproductive computational efforts.

In one embodiment, the inhomogeneity information serves not only to discard unreliable blocks, but is also used for weighting the reliability of the non-discarded blocks for the purposes of obtaining the global motion vector of the image.

Another advantage derives from the fact that the method exploits the information of a large number of blocks, so that a possible block characterized by a considerable inhomogeneity (and therefore giving rise to a large weighting coefficient) but with a motion that is not representative of the image motion (due, for example, to the presence of moving objects in the scene) will have practically no influence on the image motion estimate if many other blocks provide correct information.

Unusually, moreover, the possibility of exploiting a block motion estimation provided in this manner by a conventional MPEG encoder offers substantial advantages in economic terms.

A further example can be provided in which the present invention is used for the stabilization of video sequences. Motion estimation is done using block motion vectors. In this way the same motion estimator of MPEG encoder can be used.

Acquired video sequences can be affected by unwanted motions that create poor viewing effects in the video sequence. The present invention detects these movements in the video sequence and compensates them in order to obtain a more enjoyable and better compressed output.

Digital Image Stabilization can be subdivided in three modules that execute: motion estimation, detection of unwanted movements, and compensation.

Motion estimation is done evaluating the match in a search area of subparts of the image. The size of areas and the matching function depends on the different approaches. Image subparts can cover the entire frame or can cover only a subpart. Besides, this matching can be done on a subset of original pixels (as in Representative Point Matching or RPM) or considering a X or operation on selected binary bit planes. A matching based on edge patterns can be used. A method using Block Motion Vectors (BMV) for the Global Motion Vector (GMV) evaluation is used although authors state that in some case this algorithm has worse performance than the method based on RPM.

As shown in FIGS. 7A and 7B, the present invention uses BMV and has been shown to provide robust and reliable results. Two areas are considered in each frame identifying the foreground and background. Starting from the GMV, two weighted square histograms are built and through them a global vector for foreground area and one for background area are estimated. To each motion vector a weight is associated accordingly to the high-frequency components present in the relative block. In this way a measure of reliability is associated to each motion vector. To estimate the high-frequency components present in a block the function Activation or MAD are used. Activation is the absolute difference of consecutive elements in rows and in columns of the block. MAD is the average of deviation in the block. As illustrated in FIG. 8, if the function value is low, the block is quite homogeneous and the relative motion vector can be affected by error. Vice versa if activation is high the associated motion vector is very reliable. FIG. 8 thus shows an image block With low MAD and an image block with high MAD.

The histogram contains the occurrence of each motion vector weighted with a value related to the evaluation function and so its maximum value will give the GMV estimation for the considered area. The resulting value will be the most reliable motion vector among the most frequent vectors. In this way a motion vector for foreground and one for background is found. To decide whether to stabilize accordingly to the first or the second the number of blocks that produce the GMV is considered. If the GMV of the background area is produced by a higher number of blocks than the GMV of foreground area, background is stabilized, if vice versa, then foreground is stabilized. In the first case unwanted camera motions are compensated and final sequence will be less affected by jiggling. In the second case the subject in the central part of image is followed and it will always be in the center of the frame creating a tracking effect.

To distinguish between panning and jiggling, the Absolute Global Motion Vector (AGMV) is considered and this value is compared to a fixed threshold. When an AGMV component overcomes this threshold a large and continuative movement has been done in a direction and so no compensation is done. Stabilization will be again allowed when the component becomes lower than threshold.

In summary, the present invention stabilizes a video sequence evaluating the GMV of each frame starting from BMV. To have a reliable estimation each BMV is considered in relation to a reliability function. Stabilization is done considering foreground or background accordingly to the sequence and discrimination between jiggling and panning has been elaborated.

A person skilled in the art, especially when having to satisfy contingent and specific needs, could introduce numerous modifications and variants into the proposed image sequence stabilization method, though without thereby overstepping the protection limits of the invention as defined by the claims set out hereinbelow.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety, except as otherwise indicated.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of stabilizing an image sequence, said method comprising the following phases:

estimating a first global motion vector comprising a first motion component in a first direction, said first motion component having a first amplitude representing an amount of motion in the first direction, and said first global motion vector being representative of motion with respect to a reference image of a first image consisting of a pixel matrix;

comparing the first amplitude of said first motion component with a threshold compensation value assigned to the first direction;

associating said first motion component with either a wanted motion or an unwanted motion based at least in part on comparing the first amplitude with the threshold compensation value, said first motion component being associated with an unwanted motion when the first amplitude is smaller than said threshold compensation value and being associated with a wanted motion when the first amplitude is greater than or equal to the threshold compensation value; and processing the first image to compensate for said first motion component when said first motion component is associated with an unwanted motion, wherein said first amplitude is expressed as a number of pixels and the phase of processing the first image to compensate for the first motion component when said first motion component is associated with an unwanted motion includes translating the first image along an axis of the first direction in a direction opposite to that of the first motion component by a number of pixels equal to the first amplitude of said first component.

2. A method in accordance with claim 1, further comprising:
when, based at least in part on comparing the first amplitude with the threshold compensation value, the first amplitude is found to be greater than or equal to the threshold value, modifying the first global motion vector by making the first amplitude equal to said threshold compensation value; and
calculating a second global motion vector representative of motion of a second image with respect to the reference image, the second image being adjacent and subsequent to the first image, and said second global motion vector being calculated based at least in part on said modified first global motion vector.

3. A method in accordance with claim 1 wherein said first threshold value is initially predetermined and wherein the method comprises a further phase of adaptively varying said threshold compensation value based at least in part on results of comparing the first amplitude of said first motion component with the threshold compensation value for a plurality of images of said sequence.

4. A method in accordance with claim 2 wherein said second global motion vector comprises a second motion component in the first direction that has associated with it a second amplitude representing an amount of motion in the first direction and wherein said method further comprises phases of:
associating the second motion component with a wanted or an unwanted motion; and
processing the second global motion vector when the second motion component is associated with an unwanted motion by making the second amplitude substantially equal to half the threshold compensation value.

5. A method in accordance with claim 1 wherein said phase of estimating the first global motion vector estimates the global motion vector based at least in part on an estimation of at least one motion vector of at least one region of the first image and comprises phases of:
subdividing the at least one region of the first image into a plurality of pixel blocks;
assigning to each block of the plurality a respective weighting coefficient calculated based at least in part on a respective inhomogeneity measure; and
estimating the at least one motion vector of said at least one region based at least in part on the weighting coefficients assigned to each block of the at least one region.

6. A method in accordance with claim 5 wherein said inhomogeneity measure of each block represents a measure of non-uniformity of parameters associated with pixels of the respective block.

7. A method in accordance with claim 5, comprising also a phase of associating with at least one subset of the blocks a respective block motion vector, said phase of estimating the at least one motion vector being also based in part on said at least one block motion vector.

8. A method in accordance with claim 7 wherein said at least one subset comprises blocks for which the respective inhomogeneity measure is greater than a further threshold value.

9. A method in accordance with claim 5 wherein said inhomogeneity measure is calculated for each block based in part on luminance components of the pixels forming part of the respective block.

10. A method in accordance with claim 5 wherein said inhomogeneity measure is calculated for each block based in part on digital values of green pixels forming part of the respective block.

11. A method in accordance with claim 7 wherein said phase of estimating a motion vector of said at least one region further includes:
building a two-dimensional histogram, calculating for each of said block motion vectors a respective histogram value, said histogram value for a given block motion vector being calculated by adding the weighting coefficients of the blocks that have the given block motion vector associated with them; and
selecting as motion vector of the at least one region the block motion vector for which said operation of histogram building has calculated the greatest histogram value.

12. An apparatus configured to acquire and stabilize sequences of video images, comprising:
an optical sensor; and
a component that is configured to estimate a first global motion vector comprising a first motion component, the first motion component having a first amplitude representing an amount of motion in a first direction expressed as a number of pixels, and the first global motion vector representative of motion with respect to a reference image of a first image consisting of a pixel matrix; compare the first amplitude of the first motion component with a threshold compensation value; associate the first motion component with a wanted motion when the first amplitude is equal to or greater than the threshold compensation value; associate the first motion component with an unwanted motion when the first amplitude is less than the threshold compensation value; and compensate the first motion component when the first motion component is associated with an unwanted motion by translating the first image along an axis of the first direction in a direction opposite to that of the first motion component by a number of pixels equal to the first amplitude of said first component.

13. The apparatus of claim 12 wherein the acquired and stabilized sequences are encoded by an MPEG-type encoding, wherein the component is further configured to associate with at least one of the plurality of pixel blocks a respective block motion vector in accordance with an MPEG standard, and wherein the component is further configured to estimate the first global motion vector additionally based at least in part on the at least one block motion vector.

14. The apparatus of claim 12 wherein the component is further configured to estimate the first global motion vector based in part on at least one motion vector of at least one region of the first image, the at least one region comprising of a plurality of pixel blocks; assign to each pixel block of the plurality a respective weighting coefficient calculated based in part on a respective inhomogeneity measure; and estimate the at least one motion vector of the at least one region based in part on the weighting coefficients.

15. An apparatus for stabilizing an image sequence, comprising:
means for estimating a first global motion vector comprising a first motion component in a first direction, said first motion component having a first amplitude representing an amount of motion in the first direction, and said first global motion vector being representative of motion with respect to a reference image of a first image consisting of a pixel matrix;

means for comparing the first amplitude of said first motion component with a threshold compensation value assigned to the first direction;

means for associating said first motion component with either a wanted motion or an unwanted motion based at least in part on comparing the first amplitude with the threshold compensation value, said first motion component being associated with an unwanted motion when the first amplitude is smaller than said threshold compensation value and being associated with a wanted motion when the first amplitude is greater than or equal to the threshold compensation value; and means for processing the first image to compensate for said first motion component when said first motion component is associated with an unwanted motion, wherein said first amplitude is expressed as a number of pixels and the means processing processing the first image to compensate for the first motion component when said first motion component is associated with an unwanted motion includes translating the first image along an axis of the first direction in a direction opposite to that of the first motion component by a number of pixels equal to the first amplitude of said first component.

16. The apparatus of claim 15, further comprising:

means for compensating the first motion component when the first amplitude is found to be greater than or equal to the threshold value, by setting the first amplitude equal to said threshold compensation value; and means for calculating a second global motion vector representative of motion of a second image with respect to the reference image, the second image being adjacent and subsequent to the first image, and said second global motion vector being calculated based at least in part on said modified first global motion vector.

17. The apparatus of claim 15 wherein the means for estimating the first global motion estimates the first global motion vector based at least in part on at least one motion vector of at least one region of the first image, and further includes:

means for subdividing the at least one region of the first image into a plurality of pixel blocks;

means for assigning to each pixel block of the plurality a respective weighting coefficient calculated based at least in part on a respective inhomogeneity measure; and means for estimating the at least one motion vector of the at least one region based at least in part on the weighting coefficients.

18. A method of stabilizing an image sequence, said method comprising the following phases:

estimating a first global motion vector comprising a first motion component in a first direction, said first motion component having a first amplitude representing an amount of motion in the first direction, and said first global motion vector being representative of motion with respect to a reference image of a first image consisting of a pixel matrix;

comparing the first amplitude of said first motion component with a threshold compensation value assigned to the first direction;

associating said first motion component with either a wanted motion or an unwanted motion based at least in part on comparing the first amplitude with the threshold compensation value, said first motion component being associated with an unwanted motion when the first amplitude is smaller than said threshold compensation value and being associated with a wanted motion when the first amplitude is greater than or equal to the threshold compensation value;

processing the first image to compensate for said first motion component when said first motion component is associated with an unwanted motion;

when, based at least in part on comparing the first amplitude with the threshold compensation value, the first amplitude is found to be greater than or equal to the threshold value, modifying the first global motion vector by making the first amplitude equal to said threshold compensation value;

calculating a second global motion vector representative of motion of a second image with respect to the reference image, the second image being adjacent and subsequent to the first image, and said second global motion vector being calculated based at least in part on said modified first global motion vector, wherein said second global motion vector comprises a second motion component in the first direction that has associated with it a second amplitude representing an amount of motion in the first direction;

associating the second motion component with a wanted or an unwanted motion; and processing the second global motion vector when the second motion component is associated with an unwanted motion by making the second amplitude substantially equal to half the threshold compensation value.

19. A method in accordance with claim 18 wherein said first threshold value is initially predetermined and wherein the method comprises a further phase of adaptively varying said threshold compensation value based at least in part on results of comparing the first amplitude of said first motion component with the threshold compensation value for a plurality of images of said sequence.

20. A method in accordance with claim 18 wherein said phase of estimating the first global motion vector estimates the global motion vector based at least in part on an estimation of at least one motion vector of at least one region of the first image and comprises phases of:

subdividing the at least one region of the first image into a plurality of pixel blocks;

assigning to each block of the plurality a respective weighting coefficient calculated based at least in part on a respective inhomogeneity measure; and estimating the at least one motion vector of said at least one region based at least in part on the weighting coefficients assigned to each block of the at least one region.

* * * * *